Patented Sept. 16, 1952

2,610,979

UNITED STATES PATENT OFFICE 2,610,979

PROCESS FOR PREPARING AMINO AROYL ACETONITRILES

Leslie M. Schenck, Westfield, N. J., assignor to General Aniline & Film Corporation, New York, N. Y., a corporation of Delaware No Drawing. Application October 29, 1949, Serial No. 124,517

4 Claims. (Cl. 260—465)

This invention relates to an improved method for preparing amino aroyl acetonitriles.

In the past m- or p-aminobenzoylacetonitrile has been prepared usually by a process involving a Friedel-Crafts reaction. For example, acetanilide has been reacted with chloroacetylchloride in the presence of aluminum chloride and the product subsequently heated with hydroxide or acid and then with potassium cyanide to obtain p-aminobenzoylacetonitrile. Yields by these processes, however, have been poor.

It is an object of the present invention to provide an improved process for obtaining amino aroyl acetonitriles in good yield.

It is a further object of the present invention to provide an improved process for obtaining p-aminobenzoylacetonitriles in good yield.

It is a further object of the present invention to provide an improved process for producing m-aminobenzoylacetonitriles in good yield.

These and other objects of this invention are obtained by the present process which comprises reacting a carbethoxyamino aroyl chloride with ethylcyanoacetate by means of an enolizing agent and hydrolyzing the product to give the corresponding amino aroyl acetonitrile.

The amino aroyl acetonitrile to which the improved process is applied may be anyone having the following formula:

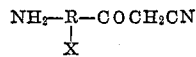

in which R is an arylene group such as phenylene or naphthylene, X is selected from the group consisting of hydrogen alkyl, halogen, alkoxy, phenyl and phenoxy, and wherein the cyano aceto group is in the m- or p-positions to the amino group.

The following examples illustrate preferred embodiments of the invention but it is understood that substitutions or variations may be made therein within the scope of the appended claims.

Example I 100 parts p-carbethoxyaminobenzoic acid is added to a solution of
175 parts benzene and
230 parts thionyl chloride.

The mixture is refluxed until the evolution of hydrogen chloride ceases and the volatile solvents are then removed in vacuo. The residual acid chloride is dissolved in 260 parts acetone, and added during a period of one hour at a temperature below 5° C. to a mixture of
275 parts acetone
106 parts ethylcyanoacetate and
49 parts 95% sodium methylate.

After stirring several hours below 5° C. the solution is drowned in water and the product precipitated by the addition of acetic acid. The crude p-carbethoxyaminobenzoylethylcyanoacetate is hydrolyzed by refluxing for ½ hour with a slight excess of 10% sodium hydroxide solution. Upon cooling, the p-aminobenzoylacetonitrole is precipitated by slowly adding acetic acid. The product is a white crystalline material having a melting point of 158–160° C.

Example II

In the manner described in Example I, m-carbethoxyaminobenzoylchloride is condensed with an acetone suspension of sodium ethylcyanoacetate, and the crude product hydrolyzed to yield m-aminobenzoylacetonitrile having a melting point of 110–111° C.

In the above examples, the acid chloride may be precipitated with petroleum ether instead of removing the volatile solvents. Furthermore, it is not necessary to dissolve the acid chloride in acetone and add slowly to the other reactants since it is possible to mix them together. The hydrolysis step may be accomplished at a temperature lower than the reflux temperature. Aqueous alkaline reactants other than aqueous sodium hydroxide may be used for the hydrolysis. Also other solvents, inert to the reaction, may be included. Instead of sodium methylate other enolizing agents such as other alkali metal alcoholates may be used as will be obvious to those skilled in the art.

As additional examples of the compounds to which this process is applicable, the following may be mentioned:

2,5-dimethoxy-4-aminobenzoylacetonitrile
2-chloro-4-aminobenzoylacetonitrile
3-amino-4-chlorobenzoylacetonitrile
2-amino-5-chlorobenzoylacetonitrile
4-phenoxy-3-aminobenzoylacetonitrile 3-aminonaphthoylacetonitrile
2-methyl-4-aminobenzoylacetonitrile
2-nitro-4-aminobenzoylacetonitrile
4-phenyl-3-aminobenzoylacetonitrile It will be understood that the carbethoxyaminobenzoylchloride used or made in the process will correspond with the final product desired as, for example, in producing 2,5-dimethoxy-4-aminobenzoylacetonitrile the reactant is 2,5-dimethoxy-4-carbethoxyaminobenzoylchloride.

In the case of p-aminobenzoylacetonitrile the reaction may be represented as follows:

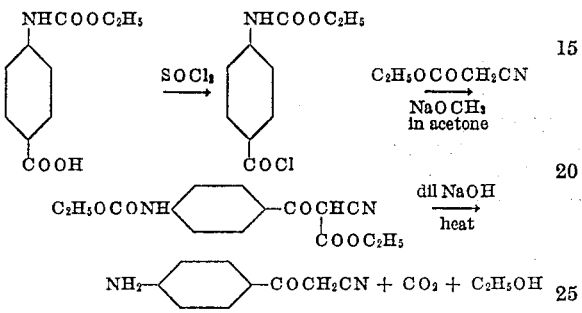

I claim:

1. An improved process for preparing an aminoaroyl acetonitrile of the formula

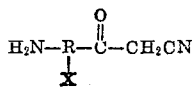

wherein R is an arylene group, X is a member of the class consisting of hydrogen, alkyl, halogen, alkoxy, phenyl and phenoxy groups, and wherein the cyanoaceto group is in a position selected from the class consisting of p- and m- to the amino group, which process comprises reacting the corresponding carbalkoxyamino aroyl chloride with ethylcyanoacetate and an enolizing agent, and heating the resulting product in a dilute aqueous alkaline medium whereby its two ester groups are selectively hydrolyzed and decarboxylated and the cyano group remains substantially intact.

2. A process of claim 1 wherein an aminobenzoyl acetonitrile is prepared from a carbethoxyaminobenzoyl chloride, and wherein sodium alcoholate is the enolizing agent and the aqueous medium is dilute sodium hydroxide.

3. A process of claim 2 wherein the cyanoaceto group is in the p-position.

4. A process of claim 2 wherein the cyanoaceto group is in the m-position.

LESLIE M. SCHENCK.

REFERENCES CITED

The following references are of record in the file of this patent:

UNITED STATES PATENTS

| Number | Name | Date |
|---|---|---|
| 2,392,167 | Long et al. | Mar. 13, 1934 |

OTHER REFERENCES

Long et al.: J. Am. Chem. Soc., vol. 69, pp. 990–995 (1947).

Dorsch et al.: J. Am. Chem. Soc., vol. 54, pp. 2960–2964 (1932).

Weizmann et al.: Chem. Abst., vol. 7, pp. 2928–2929 (1913).

Macrae et al.: Can. J. Research, vol. 6, pp. 409–416 (1932).